(12) United States Patent
Agam et al.

(10) Patent No.: US 7,783,092 B2
(45) Date of Patent: Aug. 24, 2010

(54) METHOD FOR ENHANCING DIAGNOSTIC IMAGES USING VESSEL RECONSTRUCTION

(75) Inventors: Gad Agam, Plainfield, IL (US); Changhua Wu, Grand Blanc, MI (US)

(73) Assignee: Illinois Institute of Technology, Chicago, IL (US)

( * ) Notice: Subject to any disclaimer, the term of this patent is extended or adjusted under 35 U.S.C. 154(b) by 967 days.

(21) Appl. No.: 11/334,792

(22) Filed: Jan. 17, 2006

(65) Prior Publication Data

US 2007/0165921 A1    Jul. 19, 2007

(51) Int. Cl.
  *G06K 9/00* (2006.01)
(52) U.S. Cl. ................... 382/128; 382/131; 382/154
(58) Field of Classification Search ......... 382/128–134, 382/154, 263–266, 275, 286; 378/15, 62–63; 600/407–410, 425; 601/47; 128/922–925
See application file for complete search history.

(56) References Cited

U.S. PATENT DOCUMENTS

| | | | |
|---|---|---|---|
| 4,802,231 A | 1/1989 | Davis | |
| 4,965,725 A | 10/1990 | Rutenberg | |
| 5,289,374 A * | 2/1994 | Doi et al. ................ | 600/407 |
| 5,710,833 A | 1/1998 | Moghaddam et al. | |
| 5,836,872 A | 11/1998 | Kenet et al. | |
| 5,838,815 A | 11/1998 | Gur et al. | |
| 5,857,030 A | 1/1999 | Gaborski et al. | |
| 5,987,094 A * | 11/1999 | Clarke et al. ................ | 378/62 |
| 6,026,174 A | 2/2000 | Palcic et al. | |
| 6,058,322 A | 5/2000 | Nishikawa et al. | |
| 6,078,680 A | 6/2000 | Yoshida et al. | |
| 6,320,976 B1 | 11/2001 | Murthy et al. | |
| 6,470,092 B1 | 10/2002 | Li et al. | |
| 6,611,833 B1 | 8/2003 | Johnson | |
| 6,683,973 B2 | 1/2004 | Li et al. | |
| 6,697,508 B2 | 2/2004 | Nelson | |
| 6,763,128 B1 | 7/2004 | Rogers et al. | |
| 6,937,776 B2 * | 8/2005 | Li et al. ................ | 382/260 |
| 2004/0151356 A1 * | 8/2004 | Li et al. ................ | 382/131 |
| 2007/0172105 A1 * | 7/2007 | Bahlmann et al. ......... | 382/131 |

OTHER PUBLICATIONS

Agam, G., Armato III, S.G., Wu, C., "Vessel Tree Reconstruction in Thoracic CT Scans with Application to Nodule Detection," IEEE Transactions on Medical Imaging, vol. 24, Issue 4, pp. 486-499, Apr. 2005.

(Continued)

*Primary Examiner*—Samir A. Ahmed
*Assistant Examiner*—Mehdi Rashidian
(74) *Attorney, Agent, or Firm*—Pauley Petersen & Erickson

(57) ABSTRACT

A method for improving a thoracic diagnostic image for the detection of nodules. Non-lung regions are removed from the diagnostic image to provide a lung image. Vessels and vessel junctions of the lung(s) in the lung image are enhanced according to a first-order partial derivative of each of a plurality of voxels of the lung image. A vessel tree representation is constructed from the enhanced vessels and vessel junctions. The vessel tree representation can be subtracted from the lung image to enhance the visibility of nodules in the lung(s).

20 Claims, 6 Drawing Sheets

(a)  (b)  (c)  (d)

(e)  (f)  (g)  (h)

OTHER PUBLICATIONS

Agam, G., Wu, C., "Expectation maximization approach to vessel enhancement in thoracic CT scans," Proceedings of SPIE, vol. 5747, Medical Imaging 2005: Image Processing, Apr. 2005, pp. 1703-1712.

Armato III, S.G., Altman, M.B., La Riviere, P.J., "Automated detection of lung nodules in CT scans: Effect of image reconstruction algorithm," Medical Physics, vol. 30, (3), Mar. 2003, pp. 461-472.

Wu, C., Agam, G., Roy, A.S., Armato III, S.G., "Regulated morphology approach to fuzzy shape analysis with application to blood vessel extraction in thoracic CT scans," Proceedings of SPIE, vol. 5370, Medical Imaging 2004: Image Processing, May 2004, pp. 1262-1270.

Shikata, H., Hoffman, E.A., Sonka, M., "Automated Segmentation of Pulmonary Vascular Tree from 3D CT Images," Proceedings of SPIE, vol. 5369, Medical Imaging 2004, Apr. 2004, pp. 107-116.

Li, Q., Sone, S., Doi, K., "Selective enhancement filters for nodules, vessels, and airway walls in two-and three-dimensional CT scans," Medical Physics, vol. 30, (8), Aug. 2003, pp. 2040-2051.

Frangi, A.F., "Three-Dimensional Model-Based Analysis of Vascular and Cardiac Images," Ph.D. dissertation, Ultrecht University, The Netherlands: Ponsen & Looijen (2001).

Agam, G., Wu, C., "Probabilistic modeling based vessel enhancement in thoracic CT scans," IEEE Intl. Conf. On Computer Vision and Pattern Recognition (CVPR), 2, pp. 684-689, (San Diego, CA), Jun. 2005.

Wu, C., Agam, G., "Probabilistic nodule filtering in thoracic CT scans," Medical Imaging, J.M. Reinhardt and J.P.W. Pluim, eds., Proc. SPIE 6144, pp. 1T1-1T9, 2006.

* cited by examiner

METHOD FOR ENHANCING DIAGNOSTIC IMAGES USING VESSEL RECONSTRUCTION

BACKGROUND OF THE INVENTION

This invention is directed to a method for improving a diagnostic image, such as obtained by, for example, magnetic resonance imaging (MRI) or computed tomography (CT).

Research in computer-aided diagnosis (CAD) has been facilitated by the rapid evolution in computer and medical imaging technologies in recent years. Three-dimensional diagnostic imaging tools, such as magnetic resonance imaging (MRI) and computed tomography (CT), are widely used for a vast range of applications. The result is a large increase in the amount of medical imaging data that must be analyzed. Manual analysis is often labor intensive and error prone.

Automated detection of lung nodules in thoracic CT scans is, for example, an important clinical challenge. Manual analysis by a radiologist is generally time consuming, and may result in missed nodules. Furthermore, the amount of image data that has to be analyzed continues to increase. Blood vessel segmentation in volumetric image data of lungs is a necessary prerequisite in various medical imaging applications. In the context of automated lung nodule detection in thoracic CT scans, segmented blood vessels can be used to resolve local ambiguities based on global considerations, and so improve the performance of existing detection algorithms. Thus, while blood vessels and nodules may share similar characteristics locally, global constraints inherent in the data such as the continuity of blood vessels may be used to discriminate between them. Preliminary results have shown that by using extracted blood vessels it is possible to eliminate approximately 38% of the false positives generated by an existing automated nodule detection system.

Due to its clinical importance, the problem of automated lung nodule detection in thoracic CT scans has attracted multiple research efforts in recent years. Automated nodule detection requires three main processing steps: segmentation and nodule candidate selection, nodule feature extraction, and classification. So far, relatively little effort has been devoted to the incorporation of the structure of blood vessels into the detection of nodules. Blood vessels in the lungs have a tree structure branching from the center toward the periphery of the lung. In addition to branching, blood vessels become smaller toward the periphery of the lung and may become disconnected in the image data produced by the CT scanner. Consequently, such small and disconnected segments of blood vessels are often classified erroneously as nodules. The global structure of a reconstructed tree of blood vessels can impose constraints of continuity and collinearity to reduce the number of nodule candidates, thus improving the classification results of existing systems.

Segmenting the image data correctly to distinguish between the tissue, nodules, and vessels is generally a difficult problem that has direct consequences for subsequent processing steps. Incorrect segmentation can divide structures that should be connected or connect structures that should be separated, thus leading to incorrect interpretation of the data. Due to a generally low contrast between lung tissue and small blood vessels, a common operation that is applied prior to segmentation is the enhancement of blood vessels. Enhancement filters are based on the assumption that blood vessels conform to a tubular model whereas nodules conform to a spherical model. The bifurcation of blood vessels results in junction structures which are indicated by clusters of bright pixels. While vessels, vessel junctions, and nodules, all have a relatively high intensity compared with their neighborhood, the structural assumptions of the models can be used to distinguish among these structures to enhance the contrast of blood vessels and junctions while suppressing nodules and other noise.

Available vessel enhancement filters are typically based on the observation that the ratio between the minimum principal curvature and the maximum principal curvature should be low for vessels (cylinders) and high for nodules (spheres). The principal curvatures are normally obtained as the eigenvalues of the Hessian matrix of the intensity function. The estimation of the Hessian of the intensity function involves second-order partial derivatives and so is highly sensitive to noise. Consequently, smoothing of the data at multiple scales is required. Due to noise and smoothing, junctions are characterized by a high ratio of eigenvalues and so tend to be suppressed by vessel enhancement filters; this, in turn, leads to discontinuity of blood vessels.

There is a need for improved automated analysis of diagnostic images. There is a need for improved enhancing filters to allow improved detection of nodules or other diseased tissue in diagnostic images.

SUMMARY OF THE INVENTION

A general object of the invention is to enhance diagnostic images.

A more specific objective of the invention is to overcome one or more of the problems described above.

The general object of the invention can be attained, at least in part, through a method for improving a diagnostic image including obtaining a diagnostic image, removing non-relevant regions in the image, and enhancing vessels in the image as a function of a first-order partial derivative of each of a plurality of voxels of the image.

The invention further comprehends a method for improving a diagnostic image including obtaining a diagnostic image, removing non-relevant regions in the image, enhancing vessels in the image as a function of a first-order partial derivative of each of a plurality of voxels of the image, and constructing a vessel tree representation from the enhanced vessel.

The invention still further comprehends a method for improving a diagnostic image including obtaining a thoracic diagnostic image, removing non-lung regions in the image to provide a lung image, enhancing vessels of a lung in the lung image according to a first-order partial derivative of each of a plurality of voxels of the lung image, constructing a vessel tree representation from the enhanced vessels, and subtracting the vessel tree representation from the lung image to enhance the visibility of nodules.

The method of this invention includes a novel approach to vessel tree representation construction, and its application to, for examples, nodule detection in thoracic CT scans. The method includes the enhancement of vessels, including vessel junctions, and nodules, by using enhancement filters, and the use of fuzzy shape analysis for vessel tree construction.

The vessel and nodule enhancement filters according to one embodiment of this invention are based on the eigenvalues of a correlation matrix of regularized gradient vectors, and so involve first-order partial derivatives instead of second-order partial derivatives that are used by currently available filters. By using first-order partial derivatives, the filters of this invention are less sensitive to noise. The enhancement filters employ three sets of eigenvalues of the correlation matrix, and so are capable of distinguishing between vessel junctions and nodules. This distinction is not possible with only one set of eigenvalues.

The vessel tree representation construction according to one embodiment of this invention is based on a fuzzy shape representation of the filtered or enhanced data, which is obtained by using regulated morphological operations. The construction of vessel tree representations, or "vessel trees," begins by extracting vessel segments based on principal directions in the correlation matrix and collinearity constraints. These vessel segments are then merged into vessel trees. The algorithm may accommodate vessel bifurcation and discontinuities due to noise. The method of this invention reduces or eliminates false positives, such as are often generated by currently used nodule detection algorithms.

BRIEF DESCRIPTION OF THE DRAWINGS

These and other objects and features of this invention will be better understood from the following detailed description taken in conjunction with the drawings, wherein:

FIGS. 1(a) and 1(b) show the models obtained for a synthetic and real vessel, respectively. FIGS. 1(c) and 1(d) display the models obtained for a synthetic and real junction, respectively. FIGS. 1(e)-1(f) present the models obtained for a synthetic and real nodule, respectively.

FIG. 2(a) is the original synthetic image. FIG. 2(b) shows enhanced junctions. FIG. 2(c) shows enhanced vessels and junctions. FIG. 2(d) shows enhanced nodules.

FIGS. 3(a)-(c) show single-scale enhancement results obtained by the Frangi, Shikata, and Li filters, respectively. FIGS. 3(d)-(f) show multiple-scale enhancement results obtained by the Frangi, Shikata, and Li filters, respectively.

FIG. 4(a) shows the original section image. FIGS. 4(b)-4(d) show single-scale enhancement results obtained by the Frangi, Shikata, and Li filters, respectively. FIG. 4(e) shows enhanced vessels and junctions obtained by the correlation-based filter. FIGS. 4(f)-4(h) show multiple-scale enhancement results obtained by the Frangi, Shikata, and Li filters, respectively.

DEFINITIONS

Figure 1:
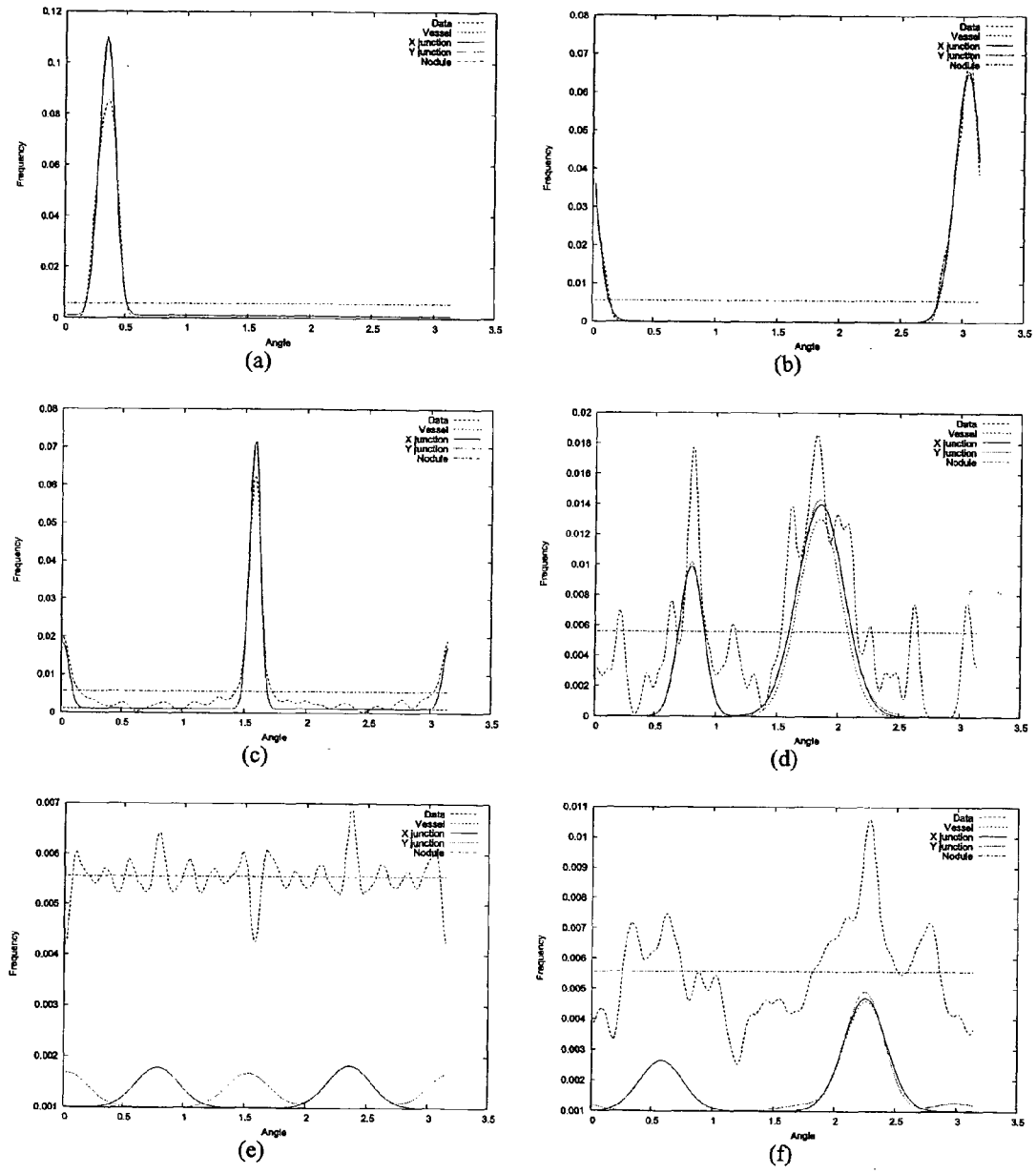
FIG. 1 shows several graphs illustrating examples of different models obtained for a synthetic and actual two-dimensional vessels, junctions, and nodules.

Within the context of this specification, each term or phrase below will include the following meaning or meanings.

As used herein, a "correlation-based filter" refers to a filter based on the analysis of the principal direction(s) of a gradient-based correlation matrix.

As used herein, "principal vessel direction" refers to the direction of a vessel as identified as a vector pointing in the direction of the minimal principal curvature of the vessel surface.

As used herein, "first-order partial derivative" refers to a derivative obtained based on first order differences. A first-order partial derivative does not contain derivatives of other derivatives.

DESCRIPTION OF PREFERRED EMBODIMENTS

The present invention provides a method for improving a diagnostic image obtained by available imaging techniques, such as x-ray, magnetic resonance imaging (MRI), and computed tomography (CT). While the method of the invention is useful in improving various diagnostic images of any portion of the body, the invention will be described below with reference to a thoracic diagnostic image for imaging of the lungs by CT scanning.

In one embodiment of this invention, a diagnostic image is obtained by an available imaging technique, such as CT scanning. The diagnostic image generally is used to image a targeted object or portion of the body, and thus non-relevant regions, i.e., the portions of the obtained image that are not related to the desired or targeted object(s), body portion(s), or organ(s) are desirable removed. The non-relevant regions, e.g., non-lung regions of a thoracic image, can be removed by various and alternative means available to those skilled in the art.

Voxels within a thoracic diagnostic image can be grouped into sets of lung tissue, blood vessels, and, if present, nodules (or other diseased portions). The method of one embodiment of this invention enhances blood vessels, including vessel junctions, and nodules, using a filter to enhance or provide a distinction between junctions and nodules. The method of one embodiment of this invention enhances vessels in the image as a function of first-order partial derivatives of a plurality of voxels of the image. Desirably, the plurality of voxels comprises at least voxels having an intensity value above a predetermined threshold.

Enhancing the vessels is performed by identifying a local neighborhood in the image and analyzing regularized vessel directions in the local neighborhood. The method determines a center of an object in the each of the plurality of voxels of the image as a function of derivatives of a voxel intensity value. A window is then defined around the determined center. The method then determines an intensity gradient vector field within the window. A principal vessel direction is determined along a minimal principal curvature direction of a vessel surface, which is obtained by determining a direction that minimizes a projection of all gradient vectors in the window. In one embodiment of this invention, the principal vessel direction is identified according to the eigenvector belonging to a largest eigenvalue of the window.

The method of this invention can analyze the regularized vessel directions in a local neighborhood according to various filter algorithms to enhance the vessels. Two exemplary enhancing filters for analyzing regularized vessel directions in the local neighborhood are an iterative principal direction estimation and a probabilistic direction analysis. The iterative principal direction estimation determines a principal vessel direction as a function of an eigenvalue of a correlation matrix of the regularized vessel directions. The algorithm then removes vectors aligned with the principal vessel direction and determines whether an additional principal vessel direction is present. The algorithm performs an iterative process until no additional principal vessel direction is determined. A single principal direction indicates a vessel, while more than one principal direction indicates a vessel junction. No principal direction indicates that the object being analyzed is a nodule. The method of this invention can construct a vessel tree, discussed further below, as a function of the eigenvalue associated with the one or more principal vessel directions.

According to probabilistic direction analysis of one embodiment of this invention, the algorithm determines a plurality of vessel vector angles in the local neighborhood. The algorithm also determines a non-parametric estimate of the distribution of the angles in the local neighborhood and a plurality of parametric estimates of the distribution of the angles as a function of an expectation maximization algorithm. A distance is measured between the non-parametric estimate and at least one of the parametric estimates. The method of one embodiment of this invention constructs a vessel tree representation as a function of the distance measurement.

The enhancing filters discussed above for enhancing the vessels provide output values representing enhanced vessels that are used to construct vessel trees. The vessel tree can be subtracted from the diagnostic image to enhance the visibility of nodules or other diseased tissue, which are often confused with vessels, and more particularly vessel junctions, in current methods for analysis. In one embodiment of this invention, constructing a vessel tree representation from the enhanced vessels includes producing a plurality of fuzzy shape vessel representations and combining the plurality of fuzzy shape vessel representations to form a vessel segment. For example, a fuzzy sphere is disposed around a center of the object detected in a voxel. The fuzzy sphere represents the possible positions of the object, i.e., the vessel. A fuzzy sphere is determined for each of a plurality of voxels. The fuzzy spheres are then combined or connected to provide one or more vessel segments. As discussed further below, the orientation of the vessel segment is desirable adjusted to better represent the actual vessel.

Once vessel segments are determined, they need to be combined to form the vessel tree. Any known and available vessel tree reconstruction algorithm can be used to merge the vessel segments to form the vessel tree representation. The vessel tree can be removed from the diagnostic image to enhance any nodules or other diseased tissue within the image. As will be appreciated by those skilled in the art following the teachings herein provided, the vessel tree representation can be analyzed to provide other useful properties, such as vessel blockage and vessel volume.

Currently available vessel enhancement filters are typically applied to each voxel in the image data at multiple scales to facilitate the enhancement of vessels with different sizes. This local analysis, in which the size of the local neighborhood is unknown, results in high computational cost. To facilitate more efficient processing and avoid the need for multiple-scale analysis, the filter response of one embodiment of this invention is computed only at a selected set of locations at which a window, either two-dimensional or three-dimensional, is adaptively set depending on a local neighborhood. The method of this invention analyzes the regularized vessel directions in the window or local neighborhood of the image.

In one embodiment of this invention, vessels are enhanced as a function of a first-order partial derivative of each of a plurality of voxels of the image. The plurality of voxels desirably include, and for more efficiency only include, voxels having an intensity value above a predetermined threshold (e.g., above a global threshold $\tau$). Since small blood vessels have low contrast, they are less likely to be detected by a global threshold and so the initial set of candidates is augmented by voxels exhibiting vessel-like characteristics. Such voxels are identified as voxels for which the largest (in absolute value) eigenvalues of the Hessian matrix are both negative. Thus, when $\lambda_1(x), \lambda_2(x), \lambda_3(x)$ are the eigenvalues of the Hessian matrix at location x such that $|\lambda_1(x)| \leq |\lambda_2(x)| \leq |\lambda_3(x)|$, the augmented set of candidate locations is given by:

$$S = \{x | I(x) > \tau \wedge (\lambda_2(x) < 0 \vee \lambda_3(x) < 0)\} \quad (1)$$

where $I(x)$ is the voxel intensity at location x. It should be noted that using the eigenvalues of the Hessian matrix alone for the purpose of identifying candidate locations is generally insufficient due to inherent noise in the data.

For the purpose of filtering, desired window locations are selected at the center of objects. The watershed line at the center of vessels and other objects is characterized by the zero-crossing of at least one of the first-order partial derivatives of the intensity function $I(x)$. Thus the initial set of candidates S is narrowed by selecting voxels for which the partial derivatives change sign between two respective symmetric neighbors:

$$C = \{s \in S | I_x(s-\hat{x})I_x(s+\hat{x}) < 0 \wedge I_y(s-\hat{y})I_y(s+\hat{y}) < 0 \wedge I_z(s-\hat{z})I_z(s+\hat{z}) < 0\} \quad (2)$$

where $I_x, I_y, I_z$ are the first-order partial derivatives of $I(x)$, and $\hat{x}, \hat{y}, \hat{z}$ are unit vectors in the x, y, z directions respectively. This selection process provides the identification of central locations within vessels as well as within junctions and nodules.

Given a center location $c \in C$, a square three-dimensional window centered about c is used in subsequent filtering stages. The direction of the window and its size are set adaptively to capture sufficient information to uniquely characterize the content of the window. Starting with a 3×3×3 voxel window centered about c, the size of the window is incremented provided that the ratio between the number of voxels in the window belonging to the set S and the total volume of the window is larger than a preset threshold value. Denoting by $W_c^k$ the set of voxels belonging to the window centered about c at the k-th iteration, this ratio is given by:

$$r_c^k = \#\{x \in W_c^k | x \in S\}/k^3 \quad (3)$$

The orientation of the window $W_c^k$ is set based on the direction of the eigenvector belonging to the smallest eigenvalue of the correlation matrix of the gradient vectors contained within the initial 3×3×3 voxel window.

The filters are based on an analysis of the direction(s) of the intensity gradient vector field. Since the estimated gradient vectors are inevitably noisy, regularization of the gradient vector field is performed. As vessels are characterized by a tubular model, the gradient vectors in a vessel can be used to extract a vector in the direction of the vessel by identifying a vector that is approximately orthogonal to the gradients in a local neighborhood. Thus, in addition to the need for regularization of the gradient vector field, the gradient vector field should be mapped into a new vector field containing vectors in possible directions of blood vessels.

Let W be a local window of size p×p×p (p is set to 3 herein). Let the set of three-dimensional gradient vectors in the local window be $G \equiv \{g_i\}_{i=1}^n$, where $n = p^3$. A direction v orthogonal to the vectors in the set G can be obtained by finding a direction that minimizes the squared projection onto v of all the gradients in the set. The squared projection of the gradients onto v is given by:

$$E(v) = \frac{1}{n}\sum_{i=1}^{n}((g_i)^T v)^2 = v^T \left(\frac{1}{n}\sum_{i=1}^{n}(g_i)(g_i)^T\right)v \quad (4)$$

Thus, denoting $$G \equiv \frac{1}{\sqrt{n}}[g_i, \ldots, g_n], E(v) \equiv v^T GG^T v,$$

where $GG^T$ is a 3×3 correlation matrix. Minimizing E(v) with respect to v can be obtained by solving the system $\nabla E(v)=0$. As the correlation matrix $GG^T$ is symmetric: $\nabla E(v)=2GG^T v$. Thus, to minimize E(v) the homogeneous linear system $GG^T v=0$ needs to be solved. The minimum of E(v) is obtained by the eigenvector of $GG^T$ belonging to its smallest eigenvalue.

As the correlation matrix $GG^T$ is known to be positive semidefinite, its eigenvalues are non-negative. $\lambda_1 \leq \lambda_2 \leq \lambda_3$ is the eigenvalues of the correlation matrix $GG^T$. $e_1$ is the unit length eigenvector belonging to the eigenvalue $\lambda_1$. A vector pointing in a direction orthogonal to the gradient vectors at location i is set as:

$$v_i = (\sqrt{\lambda_2 + \lambda_3}) e_1 \quad (5)$$

where the normalization factor $\sqrt{\lambda_2 + \lambda_3}$ is used to give a higher weight to vectors v that were produced by larger gradients, so as to reflect higher confidence in the result. The vectors $v_i$ obtained in this manner form a regularized vessel direction vector field in which the vectors point in the potential direction of blood vessels.

As discussed above, in one embodiment, to distinguish between vessels and nodules, a process of iterative principal direction estimation is used to produce secondary and tertiary sets of eigenvalues of the correlation matrix. While a distinction between junctions and nodules does not exist based on the ratio of the principal eigenvalues, such a distinction does exist when considering the ratios of the secondary and tertiary eigenvalues. To facilitate more efficient processing, and avoid the need for multiple scale analysis, the filter response is desirably computed only at selected locations at which a window size is selected adaptively.

In one embodiment of this invention the iterative principal direction estimation analyzes the directions of blood vessels in the regularized vector field. Since vectors in opposite directions indicate the same direction of a blood vessel, given a set of vectors in an adaptive window selected as described above, it is possible to invert some of the vectors so that the majority of the vectors of the same blood vessel have consistent orientation. This can be achieved, for example, in a simple way by selecting an arbitrary vector v with magnitude above the average vector magnitude $|\bar{v}|$ in the window, and inverting all vectors with an angle difference in the range $$\left[-\frac{\pi}{4}, \frac{\pi}{4}\right]$$

with respect to $-v$. That is:

$$v_i = \begin{cases} -v_i & \text{if } \frac{v_i \cdot v}{|v_i||v|} \in \left[-1, \frac{-\sqrt{2}}{2}\right] \\ v_i & \text{otherwise} \end{cases} \quad (6)$$

This process can be applied iteratively where, in each iteration, the vector v and the vectors $\{v_i\}$ in its neighborhood which were obtained in the previous iteration are removed from the set of vectors that have to be processed for orientation consistency.

In one embodiment of this invention, multiple principal directions are identified in a set of vectors. A single principal direction can be obtained based on the eigenvalues and eigenvectors of the correlation matrix as defined in Equation (4) by using the eigenvector belonging to the largest eigenvalue of the correlation matrix (provided that the ratio between each of the two smallest eigenvalues and the largest eigenvalue is small, thus indicating that a distinct direction exists). Once one principal direction is obtained, the vectors conforming to it can be subtracted or removed from the set of vectors in the window and the correlation matrix can be updated. Additional principal directions can be found by repeating this process iteratively. Repeating this process three times produces three sets of eigenvalues which are then used by the proposed filters.

For example, in one embodiment of the invention $V^{(k)} \equiv \{v_i\}_{i=1}^{n^{(k)}}$ represents the vectors of the regularized vector field obtained by using Equation (5) in a local window $W_c$ at the k-th iteration. $Q^{(k)}$ is the correlation matrix of the vectors in $V^{(k)}$ as defined in Equation (4). $\lambda_1^{(k)} \leq \lambda_2^{(k)} \leq \lambda_3^{(k)}$ represents the eigenvalues of $Q^{(k)}$ and $e_1^{(k)}$, $e_2^{(k)}$, $e_3^{(k)}$ represents the corresponding eigenvectors. If the ratio $\lambda_2^{(k)}/\lambda_3^{(k)}$ is small (for example, about 10%), there is exactly one principal direction in the direction of $e_3^{(k)}$. If the ratio $\lambda_2^{(k)}/\lambda_3^{(k)}$ is not small (for example, greater than about 50%), either no principal directions in the data exists or multiple principal directions exist. In such a case we need to obtain an estimated principal direction $\tilde{e}_3^{(k)}$ and an estimated average squared projection $\tilde{\lambda}_3^{(k)}$ in this direction.

Given an estimated principal direction of the data $\tilde{e}_3^{(k)}$, and the estimated average squared projection in this direction $\tilde{\lambda}_3^{(k)}$, a refined principal direction is based on the set of vectors with projection onto $\tilde{e}_3^{(k)}$ which is greater than or equal to the square root of $\tilde{\lambda}_3^{(k)}$.

$$F^{(k)} = \{f_j^{(k)}\}_{j=1}^{m^{(k)}} = [v_i^{(k)} | v_i^{(k)} \cdot \tilde{e}_3^{(k)} \geq \sqrt{\tilde{\lambda}_3^{(k)}}] \quad (7)$$

$R^{(k)}$ is the correlation matrix of the vectors $f_j^{(k)}$. $\delta_1^{(k)} \leq \delta_2^{(k)} \leq \delta_3^{(k)}$ are the eigenvalues of $R^{(k)}$ and $\xi_1^{(k)}$, $\xi_2^{(k)}$, $\xi_3^{(k)}$ are the corresponding eigenvectors. The eigenvector belonging to the largest eigenvalue represents the refined estimate of the extracted direction. If the ratio $\delta_2^{(k)}/\delta_3^{(k)}$ is small enough (for example, about 10%), the obtained vectors belong to a unique direction and are set at $\lambda_i^{(k)} = \delta_i^{(k)}$ and $e_i^{(k)} = \xi_i^{(k)}$. Otherwise, the conclusion can be that no unique directions exist in the set of vectors. If a principal direction is obtained, additional directions may be obtained by repeating the previous steps and updating the set of vectors $V^{(k)}$ and its correlation matrix $Q^{(k)}$ as follows:

$$V^{(k+1)} = V^{(k)} - F^{(k)} \quad (8)$$

$$Q^{(k+1)} = \frac{1}{n^{(k)} - m^{(k)}}(n^{(k)} Q^{(k)} - m^{(k)} R^{(k)}) \quad (9)$$

If the ratio $\lambda_2^{(k)}/\lambda_3^{(k)}$ is not too close to 1 (for example, about 50% or higher), $e_3^{(k)}$ and $\lambda_3^{(k)}$ can be used as the estimates $\tilde{e}_3^{(k)}$ and $\tilde{\lambda}_3^{(k)}$. Otherwise, a simple estimate may be obtained by splitting the vector set into two subsets and computing the eigenvalues and eigenvectors of the correlation matrix of each subset. The eigenvector and eigenvalue belonging to the set with the smaller ratio $\lambda_2^{(k)}/\lambda_3^{(k)}$ can then be used as the estimates $\tilde{e}_3^{(k)}$ and $\tilde{\lambda}_3^{(k)}$. Splitting the vector set into two subsets may be achieved by projecting all the vectors onto a vector orthogonal to the average vector in the set and assigning all the vectors with non-negative projection to one subset and all the vectors with negative projection to the second subset.

The enhancement filters of one embodiment of the method of this invention are based on analyzing regularized vessel directions in a local neighborhood of the image. Blood vessels are modeled by tubular segments where each tubular segment is approximately a cylinder with a Gaussian intensity profile at the section plane. Nodules are modeled by spheres with a Gaussian intensity profile in each section plane through their centers. Based on these models, each blood vessel has a central axis in a direction which is orthogonal to all the gradient vectors inside the vessel. Similarly, vessel junctions are composed of either two cylinders ("T" or "X" junctions) or three cylinders ("Y" junctions) and so have two or three distinct central axis directions. The gradient vectors of nodules do not define any distinct direction in three dimensions. Based on these model assumptions, when analyzing principal directions in the regularized vessel direction vector field, vessels should have one principal direction, junctions should have more than one principal direction, and nodules should not have any principal direction.

$\{(\lambda_1^{(k)}, \lambda_2^{(k)}, \lambda_3^{(k)})\}_{k=1}^3$ represents three sets of eigenvalues of the correlation matrix obtained above, where it is assumed that $\lambda_1^{(k)}=\lambda_2^{(k)}=\lambda_3^{(k)}=1$ if a principal direction was not found in the k-th iteration. Following the above model assumptions, three ratios of eigenvalues are defined, denoted by $\rho_1, \rho_2, \rho_3$, where $\rho_1$ has a value close to 1 for vessels and close to 0 otherwise, $\rho_2$ has a value close to 1 for junctions and close to 0 otherwise, and $\rho_3$ has a value close to 1 for nodules and close to 0 otherwise. The ratios $\rho_1, \rho_2, \rho_3$ are defined by:

$$\rho_1 = (1-v^{(1)})v^{(2)} \tag{10}$$

$$\rho_2 = 1 - v^{(2)}v^{(3)} \tag{11}$$

$$\rho_3 = v^{(1)}v^{(2)}v^{(3)} \tag{12}$$

where $v^{(k)} \equiv \lambda_2^{(k)}/\lambda_3^{(k)}$. The vessel, nodule, and junction filters are then obtained by using the ratios $\rho_1, \rho_2, \rho_3$, respectively, in an exponential filter function given by:

$$\phi_i(x) = \begin{cases} \gamma(x) e^{-\alpha(1-\rho_i)^2} & \text{if } x \in C \\ 0 & \text{otherwise} \end{cases} \tag{13}$$

where $\alpha$ is a constant normalization factor, $\gamma(x)$ is a variable attenuation factor, and C is the set defined in Equation (2). The variable attenuation factor $\gamma(x)$ is selected locally to reduce the response at filter locations in which the average projection in the primary principal direction is low. That is:

$$\gamma(x) = 1 - e^{-\beta\lambda_3(1)} \tag{14}$$

where $\beta$ is a constant normalization factor. The filter response $\phi_i(x)$ is determined based on the adaptive window $W_x$ centered about x. Thus, since the response $\phi_i(x)$ is a characterization of the window $W_x$, the filter response for all $y \in W_x$ is set to $\phi_i(x)$. Hence, in the more general case where several adaptive windows $W_y$ cover the same location x, the overall filter response at x is set to:

$$\Phi_i(x) = \max\{\phi_i(y) | x \in W_y\} \tag{15}$$

In another embodiment of this invention, a probabilistic vessel model is used to enhance or filter the diagnostic image. While the filtering results obtained using the iterative principal component selection and the probabilistic direction analysis are similar, there are advantages to both approaches. One advantage of the iterative principal component selection approach is its generally improved computational performance. One advantage of the probabilistic direction analysis is generally the automatic determination of model parameters without relying on preset thresholds.

Given the regularized gradient vectors, as described above, it is possible to transform them into a coordinate system, such as a spherical coordinate system, and normalize the distance coordinate to one. Thus, each gradient vector corresponds to an observation vector $x_i$. $X = \{x_i\}_{i=1}^N$ represents a set of identically and independently distributed observations, distributed according to a mixture density function $p(x|\Theta)$. Based on the independency assumption, the incomplete-data log-likelihood is given by:

$$l(\Theta|X) = \log \prod_{i=1}^N p(x_i|\Theta) = \sum_{i=1}^N \log\left(\sum_{j=1}^M \alpha_j p_j(x_i|\theta_j)\right) \tag{16}$$

where $\Theta = (\alpha_1, \ldots, \alpha_M, \theta_1, \ldots, \theta_M)$, $\sum_{i=1}^M \alpha_i = 1$, M is the number of components in the mixture, and $p_i(x|\theta_i)$ are the mixture components. The unknown parameter vector $\Theta$ can be obtained by maximizing $l(\Theta|X)$.

In one embodiment, an expectation maximization algorithm is used to simplify the maximization of the incomplete-data log-likelihood by assuming a hidden feature describing the unknown component in the mixture from which each observation was drawn. $y_i$ represents the hidden feature corresponding to the observation $x_i$. Taking the expectation over the (unknown) hidden features, the expected complete-data log-likelihood is given by:

$$Q(\Theta, \Theta^{(s)}) = \sum_{l=1}^M \sum_{i=1}^N \left(\log(\alpha_l p_l(x_i|\theta_l))\left(\frac{\alpha_l^{(s)} p_l(x_i|\theta_l^{(s)})}{\sum_{k=1}^M \alpha_k^{(s)} p_k(x_i|\theta_k^{(s)})}\right)\right) \tag{17}$$

where $\Theta^{(s)}$ is the best available estimate of $\Theta$ at iteration s.

Assuming that the mixture components are multivariate Gaussians, and that there is a uniform noise component in the mixture, a parametric model is obtained for vessels, vessel junctions, and nodules, given by:

$$f_p(x|\Theta) = \sum_{i=1}^{M-1} \frac{\alpha_i}{(2\pi)^{3/2}|\Sigma_i|^{1/2}}$$

$$\exp\left(-\frac{1}{2}\Psi(x-\mu_i)^T \Sigma_i^{-1} \Psi(x-\mu_i)\right) + \alpha_M p_M(x) \tag{18}$$

where $\Psi(x)$ is a distance measure function, $\mu_i$ are mean vectors, $\Sigma_i$ are covariance matrices, and $P_M(x)$ is a uniform density function. Parametric models for nodules, vessels, "T" or "X" vessel junctions, and "Y" vessel junctions, can be obtained from Equation (18) when using M=1, M=2, M=3, and M=4, respectively. By using Equation (18) in Equation (17) and maximizing over Θ, the obtained expression is linear in the unknowns and so an analytical expression for Θ may be obtained. In an alternate embodiment of this invention, a similar formulation using multivariate Cauchy distributions is used and provides similar results.

FIG. 1 illustrates examples of different models obtained for a synthetic and actual two-dimensional vessels, junctions, and nodules. FIGS. 1(a) and 1(b) show the models obtained for a synthetic and real vessel, respectively. FIGS. 1(c) and 1(d) display the models obtained for a synthetic and real junction, respectively. FIGS. 1(e)-1(f) present the models obtained for a synthetic and real nodule, respectively.

Even though the parameters vector Θ may be optimized as described earlier for each possible model, there can still be an ambiguity as to which model should be selected. In one embodiment, a straightforward approach for model selection is to compute the expected complete-data log-likelihood of each model and select the model for which the likelihood is maximal. As this approach can be sensitive to overfitting, an alternative approach is to choose the model that maximizes the posterior model probability given the data. The posterior model probability may be approximated by the well known Bayes information criterion (BIC) given by:

$$D_{BIC}(f_p^i) = 2\log \prod_{j=1}^{N} f_p^i(x_j \mid \hat{\Theta}) - P\log N \tag{19}$$

where $f_p^i(x|\hat{\Theta})$ is the estimated parametric density of the i-th model and P is the dimension of $\hat{\Theta}$. The BIC measure compensates for the number of parameters and so is not preferential to complex models.

As the observations $x_i$ may be noisy, an alternative approach for model selection is to compute a non-parametric model estimate and measure the distance between the parametric and non-parametric models in order to guide the model selection. The non-parametric density estimate may be obtained by using a kernel (Parzen) method:

$$f_n(x) = \frac{1}{N}\sum_{i=1}^{N} \frac{1}{h} K\left(\frac{x-x_1}{h}\right) \tag{20}$$

where $K(x)$ is a kernel function and h is its spread. $f_p^i(x)$ and $f_n(x)$ are the parametric and non-parametric density estimates. Commonly used measures for computing distance between density functions include the Kullback-Leibler cross entropy measure, the Kolmogorov variational distance measure, the Bhattacharyya distance measure, and the Euclidean distance measure, as defined in Equations (21)-(24), respectively.

$$D_{KL}(f_p^i, f_n) = \int f_n(x)\log\left(\frac{f_n(x)}{f_p^i(x)}\right) dx \tag{21}$$

$$D_K(f_p^i, f_n) = \int f_n(x)|f_n(x) - f_p^i(x)|dx \tag{22}$$

$$D_B(f_p^i, f_n) = -\log \int (f_n(x)f_p^i(x))^{\frac{1}{2}} dx \tag{23}$$

$$D_{SE}(f_p^i, f_n) = \int (f_n(x) - f_p^i(x))^2 dx \tag{24}$$

The Kullback-Leibler and the Kolmogorov measures have the advantage of giving higher weight to samples with higher probability. The Bhattacharyya distance measure in its essence is a correlation measure.

Based on the distance measure between the probabilistic models it is possible to determine a likelihood for each model. By using this likelihood it is possible to enhance nodules and vessels in the data. In one embodiment, $D_v$, $D_j$, $D_n$ are the distance between the nonparametric model and the vessel, junction, and nodules models respectively. The enhancement filters are defined by:

$$f_{vj} = \begin{cases} N_f & \text{if } \min(D_v, D_j) < D_n \\ 0 & \text{otherwise} \end{cases} \tag{25}$$

$$f_n = \begin{cases} N_f & \text{if } \min(D_v, D_j) > D_n \\ 0 & \text{otherwise} \end{cases} \tag{26}$$

The term $N_f$ is used to suppress noise and is given by:

$$N_f = 1.0 - \exp\left(-\frac{\overline{|v|}^2 k^2}{2\beta^2}\right) \tag{27}$$

where $\overline{|v|}^2$ is the average squared magnitude of the gradients in the local window, k is the size of the local window, and β is a constant. The multiplication by $k^2$ is due to the fact that the magnitude of the gradients is inversely proportional to the scale of structures. When a distinction between vessels and junctions is necessary, separate filters for vessels and junctions may be defined similarly by:

$$f_v = \begin{cases} (1 - |D_v - D_j|) \cdot N_f & \text{if } \min(D_v, D_j) < D_n \\ 0 & \text{otherwise} \end{cases} \tag{28}$$

$$f_j = \begin{cases} |D_v - D_j| \cdot N_f & \text{if } \min(D_v, D_j) < D_n \\ 0 & \text{otherwise} \end{cases} \tag{29}$$

To demonstrate the performance of the enhancing filters of this invention, a comparison with the performance of three other comparative filters proposed by: A. Frangi, "Three-dimensional model-based analysis of vascular and cardiac images," Ph.D. dissertation, Utrecht University, The Netherlands, 2001, ("Frangi"); H. Shikata, E. A. Hoffman, and M. Sonka, "Automated segmentation of pulmonary vascular tree from 3D CT images," in *Proc. SPIE International Symposium on Medical Imaging*, San Diego, Calif., 2004 ("Shikata"); and Q. Li, S. Sone, and K. Doi, "Selective enhancement filters for vessels and airway walls in two- and three-dimensional CT scans," *Medical Physics*, vol. 30, no. 8, pp. 2040-2051, 2003 ("Li"), all of which are herein incorporated by reference in their entireties. The evaluation includes qualitative and quantitative comparison of results obtained for both synthetic and actual clinical CT scans. It is shown that the enhancing filters of this invention provide improved results over the comparative filters. As the data used is highly anisotropic with interslice resolution, which is approximately seven times smaller than the in-plane resolution, the sections are processed independently during the filtering stage. While by doing so the eigenvalue $\lambda_1$ becomes identically 0, this does not impose any changes in the filter equations.

The comparative filters are all based on the eigenvalues of the Hessian matrix computed at selected locations and at multiple scales. The multiple scales are obtained by smoothing the data with different size Gaussian functions. The eigenvalues of the Hessian matrix are $|\lambda_1| \leq |\lambda_2| \leq |\lambda_3|$. Assuming that vessels conform to a tubular model with a Gaussian profile on the section plane, the eigenvalues of the Hessian matrix satisfy the following properties: $|\lambda_1| << |\lambda_2|$ and $|\lambda_2| \approx |\lambda_3|$. The eigenvector corresponding to $\lambda_1$ points in the direction of the vessel whereas the two other eigenvectors belong to the section plane. Due to the assumption that a vessel is brighter at its center, it is expected that both $\lambda_2$ and $\lambda_3$ are negative. Based on these assumptions, Frangi proposed the following vessel enhancement filter:

$$\psi_s(x) = \eta(\lambda_2, \lambda_3) \tag{30}$$
$$\left(1 - \exp\left(-\frac{R_a^2}{2\alpha^2}\right)\right) \exp\left(-\frac{R_b^2}{2\beta^2}\right) \left(1 - \exp\left(-\frac{R_c^2}{2\gamma^2}\right)\right)$$

where x is the location of the filter, s is the scale of the filter, $\alpha$, $\beta$, $\gamma$, are constant normalization factors, and $R_a$, $R_b$, $R_c$ are given based on the eigenvalues of the Hessian matrix: $R_a = |\lambda_2|/|\lambda_3|$, $R_b = |\lambda_1|/(|\lambda_2 \lambda_3|)^{0.5}$, $R_c = (\lambda_1^2 + \lambda_2^2 + \lambda_3^2)^{0.5}$. The function $\eta(\lambda_2, \lambda_3)$ is set to 1 when $\lambda_2 < 0 \vee \lambda_3 < 0$, and set to 0 otherwise. Given a set of several scales T, the filter output at location x is given by:

$$\Psi(x) = \max\{\Psi_s(x) | s \in T\} \tag{31}$$

Based on similar considerations, Shikata defines a vessel enhancement filter at a single scale as:

$$\Psi_s(x) = \eta(\lambda_2, \lambda_3) s^2 |\lambda_2|/I(x) \tag{32}$$

where I(x) is the voxel intensity at location x.

Similarly, Li proposes a slightly modified computation of the vessel enhancement filter $\Psi_s(x)$ and added a definition of a nodule enhancement filter $\zeta_s(x)$. These filters are given by:

$$\Psi_s(x) = \eta(\lambda_2, \lambda_3) |\lambda_2|(|\lambda_2| - |\lambda_1|)/|\lambda_3| \tag{33}$$

$$\zeta_s(x) = \eta(\lambda_2, \lambda_3) |\lambda_1|^2/|\lambda_3| \tag{34}$$

The filter output at location x based on multiple scales in all these filters is computed by using Equation (31).

Comparing the proposed correlation-based filter in Equation (13) to the Hessian-based comparative filters described above, it is possible to observe that while all use expressions of eigenvalues, the correlation-based eigenvalues of this invention are based on first-order partial derivatives whereas the Hessian-based comparative filters are based on second-order partial derivatives, which are more sensitive to noise. Moreover, while all the filters use the maximum value obtained in several windows, the correlation-based filter of this invention employs adaptively sized windows and so do not require processing at multiple scales. This results in increased efficiency. Finally, it is possible to observe that the correlation-based filter of this invention is based on three sets of eigenvalues compared with one set of eigenvalues in the Hessian-based comparative filters. Consequently, the correlation-based filter of this invention is able to distinguish between nodules and junctions. This capability is not possible when using only one set of eigenvalues as is the case in the Hessian-based comparative filters.

Figure 2:
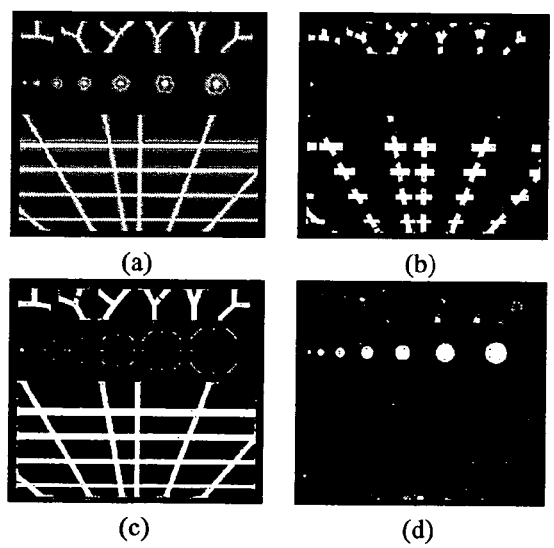
FIG. 2 shows enhanced vessels, junctions, and nodules, enhancement by the proposed correlation-based filters.
Figure 3:
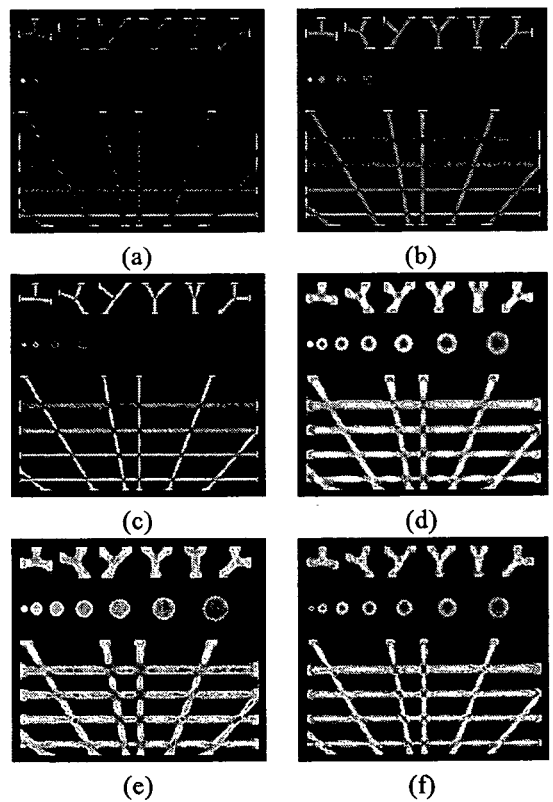
FIG. 3 shows vessel enhancement by Hessian-based filters applied at a single and multiple scales.

A qualitative performance evaluation of the correlation-based filters of this invention and the Hessian-based comparative filters on a synthetic image is presented in FIGS. 2 and 3. The synthetic image is presented in FIG. 2(a). This image contains different kinds of junctions and different sizes of vessels and nodules. The vessels and nodules were produced with Gaussian intensity profiles along the cross sections. The enhanced junctions, vessels and junctions, and nodules produced by the correlation-based filters are shown in FIGS. 2(b)-2(d) respectively. As can be observed, the enhancing filters of this invention are capable of distinguishing between junctions and nodules due to the use of multiple sets of eigenvalues of the correlation matrix. The enhanced vessels produced by the Hessian-based comparative filters applied at single (T={1}) and multiple (T={1,√2,2,2,√2,4,4,√2}) scales are presented in FIG. 3.

FIGS. 3(a)-3(c) show single-scale enhancement results obtained by the Frangi, Shikata, and Li filters, respectively, whereas FIGS. 3(d)-3(f) display the corresponding multiple-scale enhancement results obtained by the same filters. As can be observed the single-scale filters result in the suppression of vessels and junctions while not completely suppressing nodules. The multiple-scale filters suppress the centers of junctions and nodules while not suppressing nodules completely. The suppression of junctions can have an adverse effect on the production of connected vessel networks. The synthetic test image requires processing at multiple scales due to the presence of different size structures. Larger structures require analysis at coarser scales and so require smoothing with larger kernels. Smoothing with larger kernels in known to generally result in enlarged structures in the filtered image. The enlargement of wide vessels can be observed in FIGS. 3(d)-3(f). Since the only smoothing in the correlation-based filter is typically done at a small scale prior to the gradient vectors computation, the enlargement that occurs in the correlation-based filtering results is small.

Figure 4:
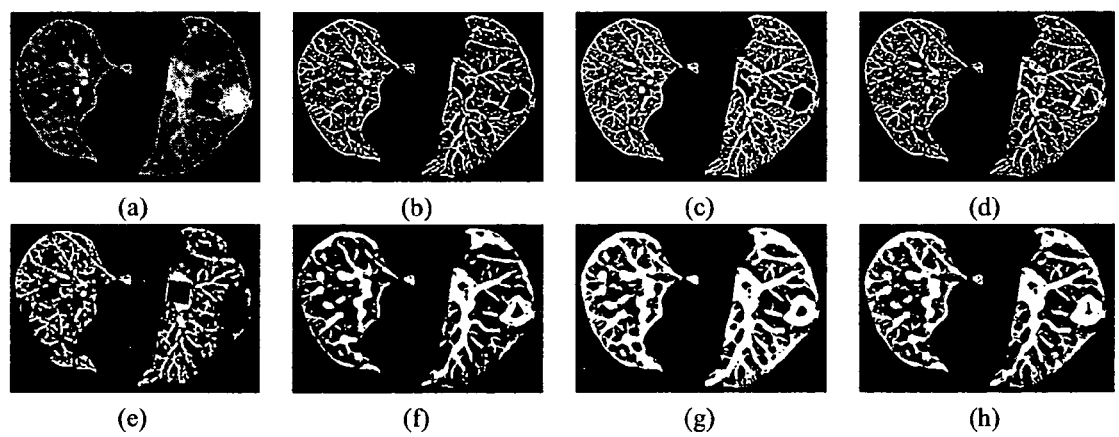
FIG. 4 shows results of the comparison of a correlation-based filter of this invention and Hessian-based comparative filters for vessel enhancement in an actual clinical CT section.

The results of the correlation-based filter of this invention and the Hessian-based comparative filters for vessel enhancement in an actual clinical CT section are presented in FIG. 4. FIG. 4(a) shows the original section image. FIGS. 4(b)-4(d) present single-scale enhancement results obtained by the Frangi, Shikata, and Li filters, respectively. FIG. 4(e) shows enhanced vessels and junctions obtained by the correlation-based filter. FIGS. 4(f)-4(h) present multiple-scale enhancement results obtained by the Frangi, Shikata, and Li filters, respectively. The filter results in these figures were segmented by an adaptive global threshold to better exhibit the details. As can be observed the correlation-based filter of this invention enhances both small and large vessels without enlarging them or suppressing their centers while suppressing the nodule (the large, bright, circular object in the lung on the right side of the image).

To obtain a quantitative comparison of the correlation- and Hessian-based filters it is desirable to have data for which the ground truth is known so that the enhancement error with respect to this truth can be measured. Since the synthesis of data may not be sufficiently realistic, the approach is to generate ground truth test data based on actual clinical data. Given actual CT scans, a segmentation process was used to create a mask representing the ground truth for each slice. The test data was generated by masking the original data with the generated ground truth masks. The test data was processed by each of the enhancement filters and the results were segmented by using an adaptive global threshold. The mean square error between the known ground truth and the segmented results was then measured for each slice. The mean square error was computed based on the sum of intensity differences of corresponding (binary) voxels which was then normalized by the volume of the ground truth data. The initial segmentation used for generating the test data is an adaptive threshold scheme which is based on R. M. Haralick, S. R. Sternberg, and X. Zhuang, "Image analysis using mathematical morphology," *IEEE Trans. Pattern Analysis and Machine Intelligence*, vol. 9, no. 4, pp. 532-550, 1987, and described in C. Wu, G. Agam, A. S. Roy, and S. G. Amato III, "Regulated morphology approach to fuzzy shape analysis with application to blood vessel extraction in thoracic CT scans," in *Proc. SPIE International Symposium on Medical Imaging*, San Diego, Calif., 2004, both of which are herein incorporated by reference in their entireties. As this adaptive threshold scheme is based on local histogram analysis without employing any differential quantities, it is not related in any obvious way to the evaluated enhancement filters. The error distribution of the results obtained by analyzing 600 slices is presented in FIG. 5.

Figure 5:
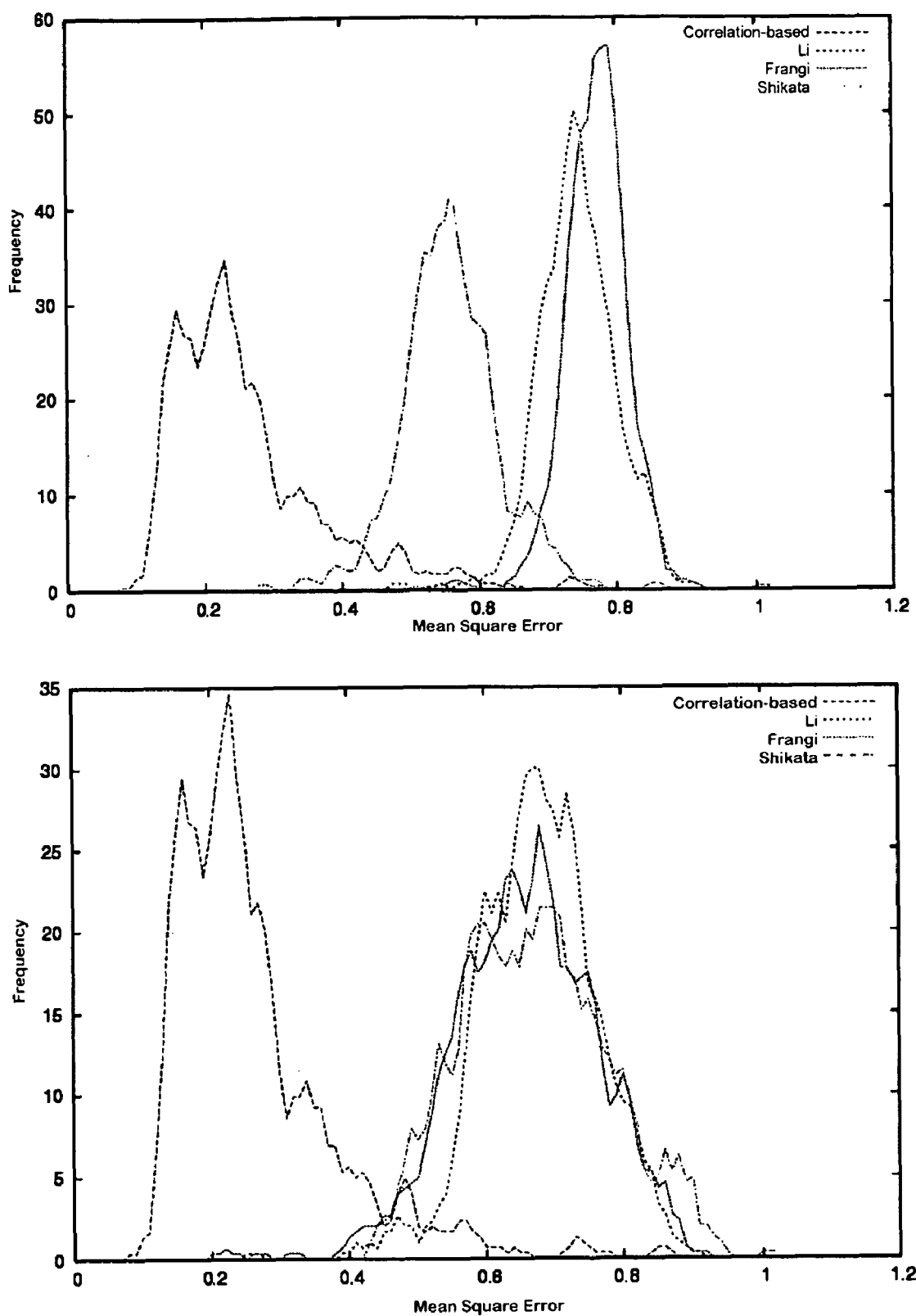
FIG. 5 shows the error distribution of a correlation-based filter compared with single-scale Hessian-based filters (top) and multiple-scale Hessian-based filters (bottom).

The top portion of FIG. 5 presents the error distribution of the correlation-based filter of this invention compared with single-scale Hessian-based comparative filters. The bottom portion shows the error distribution of the correlation-based filter compared with multiple-scale Hessian-based filters. As can be observed the error introduced in the correlation-based filter is smaller than that of the Hessian-based filters. The summary of the mean and standard deviation of the error obtained by the different filters is presented in Table 1. In this table, 's' indicates a single scale analysis whereas 'm' indicates a multiple scale analysis. Since the error measurements are obtained as normalized distance measurements between two binary objects (as described earlier), each error measurement corresponds to an error rate and is thus unitless.

TABLE 1

| Method | Correlation | Li | | Frangi | | Shikata | |
|---|---|---|---|---|---|---|---|
| Scale | | s | m | s | m | s | m |
| Mean | 0.255 | 0.733 | 0.667 | 0.760 | 0.647 | 0.546 | 0.661 |
| Std. Dev. | 0.120 | 0.056 | 0.084 | 0.045 | 0.103 | 0.070 | 0.108 |

The enhanced vessels provided by the enhancing filters of this invention can be used to construct a vessel tree representation. A vessel tree structure is a high-level form of representation that can assist in analyzing and interpreting the image data. The method of one embodiment of this invention forms vessel tree representations using fuzzy shape representations of the data which are obtained by using regulated morphological operations. Given the fuzzy shape representations, vessel segments are extracted, aligned, and then combined to produce vessel trees.

Regulated morphological operations are generally less sensitive to noise and can be used to produce fuzzy shape representations. In one embodiment of this invention, these operations form the basis of a vessel tree representation construction algorithm. Binary morphological erosion and dilation operators are based on opposing strict approaches. The binary dilation collects shifts for which the kernel set intersects the object set without taking into account the size of the intersection, whereas the binary erosion collects shifts for which the kernel set is completely contained within the object set without considering shifts for which some kernel elements are not contained within the object set. As a result of these strict requirements, ordinary morphological operations are sensitive to noise and small intrusions or protrusions on the boundary of shapes. To solve this problem, regulated morphological operations are defined by extending the fitting interpretation of the ordinary morphological operations. The regulated dilation and erosion of the set A by the kernel set B with a strictness of S are defined respectively by:

$$A \overset{s}{\oplus} B \equiv \left\{ x \,\middle|\, \#\!\left( A \cap \underset{x}{\cup}(\bar{B})_x \right) \geq s \right\}; s \in [1, \eta_+] \qquad (35)$$

$$A \overset{s}{\ominus} B \equiv \{ x \,|\, \#(A^c \cap (B)_x) < s \}; s \in [1, \eta_-] \qquad (36)$$

where $\eta_+ = \min(\#A, \#B)$, $\eta_- = \#B$, $\#A$ denotes the cardinality of the set A, $\bar{B}$ denotes the reflection of the set B defined by $\bar{B} \equiv \{x | \exists b \in B : x = -b\}$, and $(B)_x$ denotes a shift of B by x defined by $(B)_x \equiv \{y | \exists b \in B : y = x + b\}$. The regulated dilation and erosion may be obtained from each other by reflecting the kernel set and complementing the strictness relative to the kernel set:

$$A \overset{s}{\ominus} B = \left( A^c \overset{s}{\oplus} \bar{B} \right)^c = A \overset{\overline{s_B}}{\oplus} \bar{B} \qquad (37)$$

where the complement of the strictness S relative to the set B is defined by: $\overline{s_B} \equiv \#B - s + 1$. From these basic regulated morphological operations it is possible to define an extensive regulated dilation and an anti-extensive regulated erosion. By using the extensive operations it is possible to define idempotent regulated open and close operations which extend the fitting interpretation of the ordinary open and close operations. The idempotency of these operations demonstrates their abilities to capture fundamental characteristics of the data. Regulated morphological operations have been shown to possess many of the properties of ordinary morphological operations. In particular, ordinary morphological operations can be obtained as special cases of the regulated morphological operations when using a strictness s=1.

The regulated morphological operations are used to provide a fuzzy shape representation for constructing a vessel tree representation. Such a representation is necessary due to noise present in the data and due to the discrete nature of the volumetric data produced by CT scans. In one embodiment of this invention, a fuzzy sphere representation of an object is produced from a regulated erosion operation with a strictness parameter greater than 1 is applied to a set of voxels in the center of objects C obtained by Equation (2).

The erosion operation is applied at multiple scales by increasing the size of the spherical kernel at each iteration and recording the size of the largest sphere that fits the object at this location while satisfying the regulated strictness constraint. $c_i \in C$ is the center of the i-th sphere. $K(r)$ is a spherical kernel of radius r. The radius $r_i$ of the fuzzy sphere at location $c_i$ is set to:

$$r_i = \max \left\{ r \,\middle|\, c_i \in \left( S \overset{s}{\ominus} K(r) \right) \right\} \qquad (38)$$

where S is the set of all the candidate object voxels in the data as expressed in Equation (1), and s is the strictness parameter of the regulated morphological operation (for example, set to 2.25). The set $O \equiv \{(c_i, r_i)\}_{i=1}^P$ together with the strictness parameter s used in computing $r_i$ forms a compact fuzzy sphere representation of objects in the data. Given this representation, the set of all object voxels in the data is given by:

$$\tilde{S} = \bigcup_{(c_i, r_i) \in O} c_i \oplus K(r_i) \quad (39)$$

To reduce the number of fuzzy spheres in the representation, the fuzzy sphere set O is filtered so that spheres with centers that are covered by larger spheres are removed:

$$O' = \{(c_i, r_i) \in O | \forall (c_j, r_j) \in O \; \vee c_i \in (c_i \oplus K(r_i)) : r_j < r_i\} \quad (40)$$

Spheres of identical size with centers in the domain of each other are resolved by considering the mean intensity $\bar{I}(c_i, r_i)$ within the spheres and choosing the sphere with the higher mean intensity:

$$O'' = \{(c_i, r_i) \in O' | \forall (c_j, r_j) \in O' \vee c_i \in (c_i \oplus K(r_i)) : \bar{I}(c_j, r_j) < \bar{I}(c_i, r_i)\} \quad (41)$$

In order to prevent erosion of vessels due to the elimination of spheres at terminal locations, the sphere removal process is applied iteratively based on size, starting with the largest spheres.

Given the fuzzy sphere representation of the vessel-enhanced volumetric data, obtained above, a higher level representation may be obtained by combining several spheres into vessel segments. Such vessel segments can then be used in the vessel tree reconstruction. Forming vessel segments according to one embodiment of this invention is based on constraints of collinearity of fuzzy sphere centers, size consistency, and direction consistency.

The gradient vectors at voxel locations within a sphere $o_i \in O''$ can be used to define a possible vessel direction based on the eigenvectors of the correlation matrix. The degree to which a sphere conforms to a vessel model can be estimated by considering the ratio $\lambda_2/\lambda_3$ of the eigenvalues of the correlation matrix ($\lambda_1$ and $\lambda_3$ being the smallest and largest eigenvalues, respectively). By using the ratio $\lambda_2/\lambda_3$, it is possible to split the set of spheres $O''$ into two subsets $O''_V$ and $O''_J$. The subset $O''_V$ contains spheres with eigenvalue ratio smaller than a preset threshold (for example, about 70%) and so are likely to belong to vessels. The subset $O''_J$ contains spheres with eigenvalue ratios above the threshold and so are more likely to belong to junctions and nodules.

The process of connecting neighboring spheres in the set $O''_V$ to form vessel segments is an iterative process in which at each iteration a single sphere satisfying certain conditions is added to the vessel segment. For example, let $o_i \in O''_V$ be the current end of the vessel segment ($o_i$ is selected randomly in the first iteration). A neighboring sphere $o_j \in O''_V$ is a candidate for addition into the vessel segment if it satisfies the following conditions: the size $r_j$ of $o_j$ is similar to the average size of the spheres already in the vessel segment; the eigenvalue ratio computed in $o_j$ is similar to the eigenvalue ratio in $o_i$; and the spheres $o_i$ and $o_j$ have some overlap ($|c_i - c_j| < (r_i + r_j)$).

Given the possible candidate spheres $o_j$, the one with the smallest distance from the approximated vessel center is selected, provided that its distance from the vessel center is smaller than the average sphere size in the vessel segment. $v_i$ is the principal direction of the sphere $o_i$ obtained by Equation (5). The distance of a candidate $o_j$ from the center of the vessel is measured by:

$$d_{ij} = \frac{|(c_j - c_i) \times v_i|}{|v_i|} \quad (42)$$

The addition of spheres to a vessel segment is stopped when no additional spheres are found. Since the initial sphere is selected randomly, it is not necessarily at the beginning of a vessel segment. Thus, once growth in one direction is complete, the process of adding spheres to the vessel segment resumes from the initial sphere in a similar manner but in the opposite direction. Spheres assigned to a specific vessel segment are removed from the set $O''_V$, and the process proceeds until no new vessel segments can be found.

The vessel segments obtained above generally have well-defined directions. Their orientation, however, is not always uniquely determined. To reconstruct the vessel tree, consistent orientation of vessel segments is desired. While the orientation of vessel segments cannot be determined locally, consistency constraints in a local neighborhood can be used for proper orientation selection.

The vessel orientation consistency problem can be formulated as follows. $l_i$ is the i-th vessel segment. The end spheres of $l_i$ are $o_i^s$ and $o_i^e$. The direction of this vessel segment is given by $d_i = (c_i^e - c_i^s)$, where $c_i^s$ and $c_i^e$ are the centers of the spheres $o_i^s$ and $o_i^e$. $\{l_j\}_{j=1}^m$ represents a set of m vessel segments in the neighborhood of $l_i$ with corresponding directions of $\{d_j\}_{j=1}^m$. The consistency with $l_i$ in a local neighborhood is defined by summing the projections onto $d_i$ of the direction vectors of its neighbors:

$$h_i = \sum_{j=1}^{m} (\sigma_j d_j)^T (\sigma_i d_i) \quad (43)$$

where $\sigma_i$ and $\sigma_j$ represent the unknown signs of $d_i$ and $d_j$. Given n vessel segments, the total consistency in the data is given by: $H = \sum_{i=1}^{n} h_i$. As the consistency in local neighborhoods is interdependent, a globally consistent orientation requires the maximization of the total consistency H. Thus, the orientation of vessel segments can be determined by obtaining the sign coefficients $\sigma_i$ that maximize the total orientation consistency H.

The vessel segment orientation problem as formulated above is a non-linear optimization problem that can be solved iteratively by maximizing the local consistency $h_i$ at each iteration. Global maximization of H is obtained through the propagation of changes between iterations. In the k-th iteration the maximization of the local consistency $h_i$, based on its definition in Equation (43), is immediate and is given by:

$$\sigma_i^{(k)} = \text{sgn}\left(\sum_{j=1}^{m} \sigma_j^{(k-1)} d_j^T d_i\right) \quad (44)$$

As can be observed, since the vectors $d_i$ are not normalized, larger vessel segments have larger influence on the orientation of their neighbors and can force the orientation of small vessel segments to conform to that of large ones. To improve the convergence rate of the solution, the initial values of the unknown sign coefficients $\sigma_i$ are set based on a rough assumption that vessel segments point away from the center of the lung. Convergence to a solution is determined when an iteration does not produce any change. In one embodiment of this invention, convergence occurs within approximately 10 iterations.

A vessel tree reconstruction algorithm, such as is available to those skilled in the art, is applied to merge the vessel segments into vessel trees. In one embodiment of this invention, the reconstruction is performed in two steps. First, vessel segments are merged through junctions to form subtrees. Then, subtrees are merged into larger trees.

In an exemplary embodiment, $\{l_j\}_{j=1}^n$ represents the set of extracted vessel segments. $O''_J$ is the set of junction spheres as defined above and augmented by spheres not belonging to any vessel segment. The junction spheres $o_i \in O''_J$ form a set of candidates through which vessel segments can be merged. Given a junction sphere $o_i \in O''_J$, a set of potential vessel segments that can be merged through this junction is identified by checking for intersections between the junction sphere and the end spheres of the vessel segments. By using the orientation of the vessel segments intersecting at $o_i$ it is possible to classify them as either incoming or outgoing vessel segments. Based on considerations of similarity, and by using the distance between $o_i$ and the centers of the incoming vessel segments (computed by Equation (42)), a single incoming vessel segment can be selected. The selected incoming vessel segment is set as the first child of a subtree, and the outgoing vessel segments are set as its children. If a valid incoming vessel segment is not identified, the outgoing vessel segments are set as the first children of a subtree. Vessel segments not connected through any junctions are set as single-node subtrees.

The merging process assumes that vessel segments should be merged about isolated junction spheres. Since in many cases junction spheres may be connected to vessel segments, a second vessel merging stage tests for possible subtree merging about the ending spheres of any node in them. Given two subtrees $t_i$ and $t_j$, the first level nodes of $t_j$ can be connected as children of any node $l_k$ in $t_i$, provided that the first sphere in any of these nodes intersects the end sphere of $l_k$, and that the similarity and distance conditions described earlier are met. For the purpose of computing the distance of the end sphere of the node $l_k$ from the center line of the first level nodes of $t_j$, it may be necessary to estimate an average center line from multiple nodes. Such an average center line can be computed by a weighted average of the principal directions of the first spheres in the first level nodes, where the weight coefficients are proportional to the length of the corresponding vessel segments. Finally, it should be noted that gaps between vessels may be bridged by relaxing the connectivity conditions stated earlier.

To further demonstrate the method of this invention, vessel trees were constructed from actual clinical data. Scans from 38 diagnostic thoracic helical CT studies were collected retrospectively from different patients (22 females, 16 males; age range 31-94 years, with a mean age of 62 years). The CT studies had been performed on GE HiSpeed scanners (GE Medical Systems, Milwaukee, Wis.) with a standard clinical protocol of 120 kVp, 7 mm collimation, 1.4 helical pitch, and mm reconstruction interval. For some examples, sections near the lung bases deviated from the nominal reconstruction interval of 5 mm. The 38 studies comprised a total of 1953 512×512-pixel section images; the number of sections per study ranged from 37 to 61, with a mean of 51 sections per study. The image data, initially acquired at 12-bit grayscale resolution, were reduced to 10 bits through a simple division of gray levels by a factor of four. Section images representing anatomy superior to the lung apices or inferior to the lung bases were manually excluded from each case. The pixel dimensions ranged from 0.547 to 0.938 mm. The exposure rates used for image acquisition ranged from 220 to 300 mA, with all but five of the scans having been performed at 220 mA. The presence of nodules in the selected cases was reported during clinical interpretation and was noted in the radiology reports. In addition, the location of individual nodules was indicated by an experienced chest radiologist who reviewed the standard database scans on softcopy by using a computer interface. The 38 CT studies contained a total of 82 lung nodules. The mean effective nodule diameter was 14.7 mm.

Figure 6:
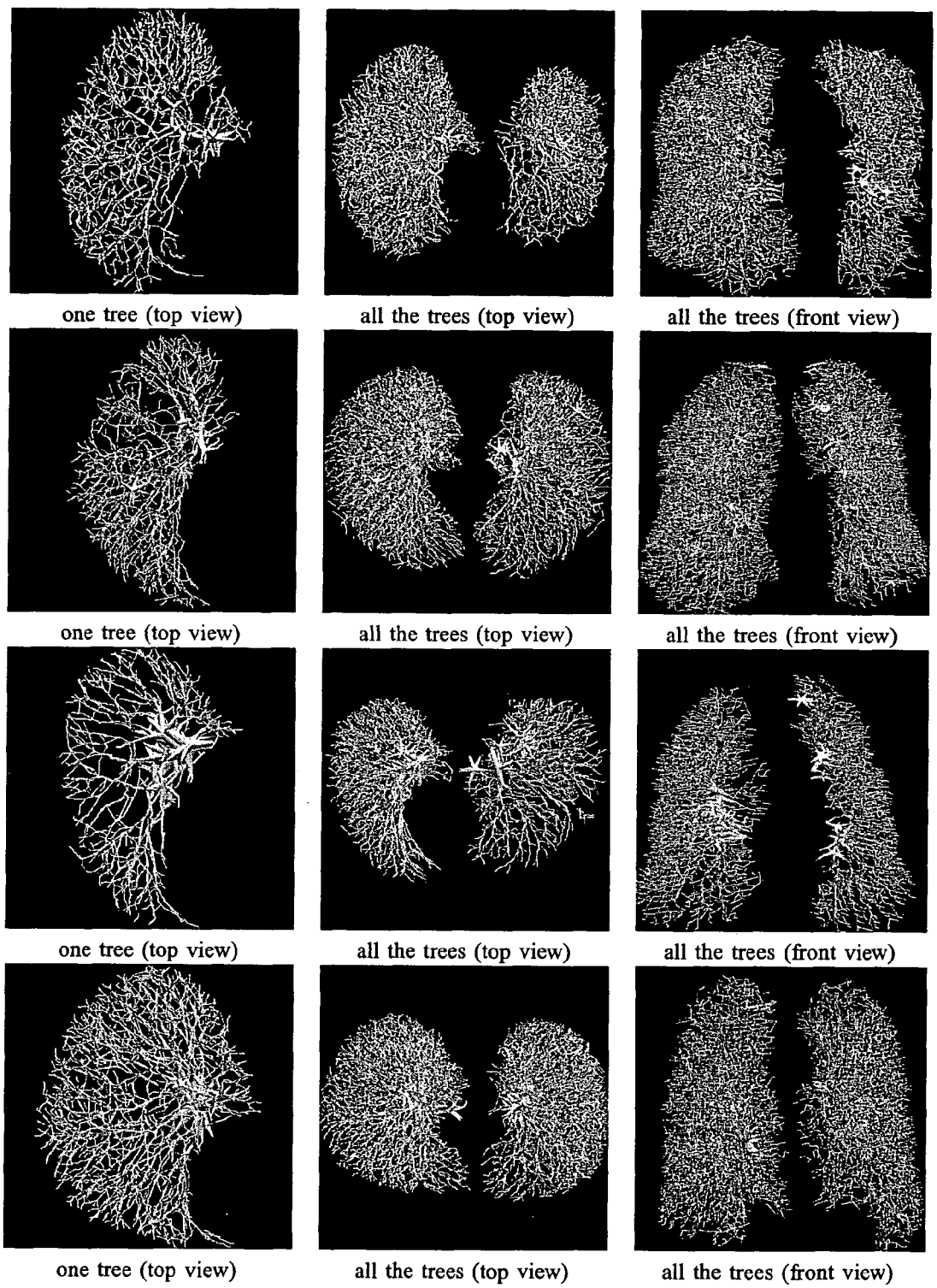
FIG. 6 shows several vessel tree representations.

Renderings from multiple viewpoints of several obtained vessel tree construction results are presented in FIG. 6. It should be noted that typically the reconstruction results in about 3 to 5 major vessel trees and about 10 small vessel trees per case. The small vessel trees are formed due to vessel segments which appear to be separated from the main vessel network. Extracted trees normally include vessels of approximately six generations.

The vessel tree construction results obtained were evaluated quantitatively in terms of correctness and robustness. Additionally, as a desirable purpose of vessel tree reconstruction is nodule detection, a goal-oriented evaluation of the results was performed. The basic performance of the vessel tree reconstruction algorithm was evaluated based on a distance measure between a known tree structure and a reconstructed one. As the generation of synthetic data for which the true vessel tree is known may not be sufficiently realistic, our evaluation is based on different versions of actual clinical data corrupted by multiplicative Gaussian noise with various standard deviations. The vessel tree extracted from the original noiseless version serves as the known model against which the recovery results of the noisy data are compared.

The distance between two trees is computed based on the distance between their corresponding spheres. The distance function that is used to measure the difference between spheres is composed of four terms. The first term measures Euclidean distance between their centers. The second term measures size difference between them. The third term measures angle difference between them. The fourth term measures topological differences by considering the difference in the number of their children. $(c_i, r_i)$ and $(c_j, r_j)$ are two corresponding spheres for which we want to compute the distance measure. The expression for the distance measure is given by:

$$D_{ij} = w_1\left(1 - e^{-|c_i - c_j|}\right) + w_2\left(\frac{|r_i - r_j|}{r_i + r_j}\right) + w_3\left(1 - \frac{|(c_i - c_i) \cdot (c_j - c_j)|}{|c_i - c_i||c_j - c_j|}\right) + w_4\left(\frac{|n_i - n_j|}{n_i + n_j}\right) \tag{45}$$

where $w_1$-$w_4$ are convex combination coefficients (selected as ¼ in our study), $n_i$ and $n_j$ are the number of children of $(c_i, r_i)$ and $(c_j, r_j)$, and $(c_i, r_i)$ and $(c_j, r_j)$ are the predecessors of $(c_i, r_i)$ and $(c_j, r_j)$, respectively. If there is no corresponding sphere due to noise, the distance measure is set to its maximal possible value (one). Based on this distance measure a mean distance measure for each noise level was computed.

Figure 7:
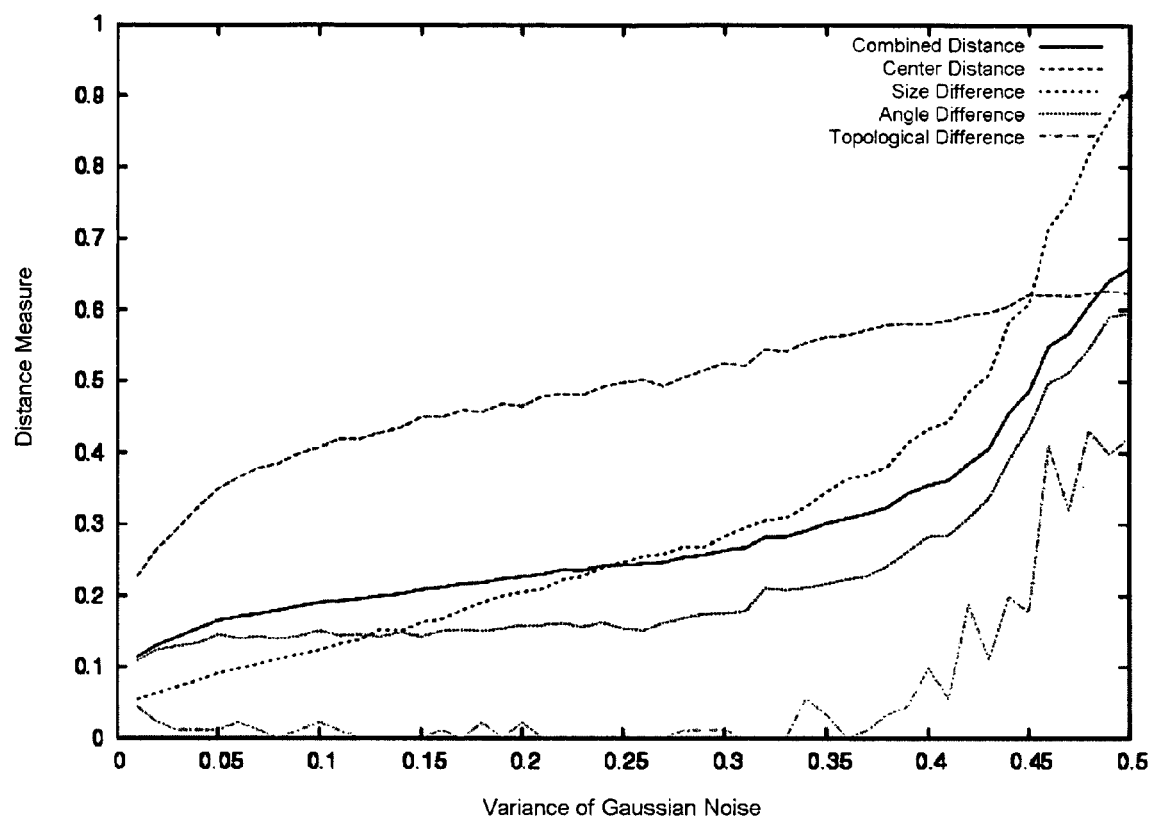
FIG. 7 shows performance evaluation results of a vessel tree reconstruction algorithm evaluated on one case

FIG. 7 shows the performance evaluation results of the vessel tree reconstruction algorithm evaluated on one case containing 45 slices. Multiple noisy versions of the original data are generated by incorporating multiplicative Gaussian noise with various standard deviations. The distance between the initial reconstruction and the reconstruction obtained in the noisy versions is measured. FIG. 7 presents the values of both the individual components of the measure and the combined distance measure. The value of the topological difference component in this figure is multiplied by 100 to show its details. The reconstruction error up to a noise level of approximately 30% is small, thus demonstrating the robustness and consistency of the proposed approach.

In order to verify the correctness of the automatically extracted vessel tree in terms of its correspondence to actual vessels in the data, an experiment was conducted in which the automatically extracted vessels were compared to manually selected vessels tagged by a resident. The manual selection of vessels in this experiment was done on the section images by selecting a point on a vessel and then interactively varying the similarity threshold of a flood-fill algorithm while observing the selected pixels overlaid onto the section image. The resident manually tagged vessels up to a fourth or fifth generation in five different cases each containing approximately 45 section images. The manual labeling of vessels in CT images is typically a tedious process, and the inevitable omission of fourth or fifth generation vessels during manual labeling resulted in an incomplete standard. Accordingly, the comparison of automated results with the manually labeled vessels was only used to identify vessels that were missed by the automated algorithm (i.e., false-negative vessel pixels).

nodules in CT scans: effect of image reconstruction algorithm," *Medical Physics*, vol. 30, no. 3, pp. 461-472, 2003, hereby incorporated by reference in its entirety. Given a set of nodule candidates produced by the nodule detection algorithm, the volume overlap between the nodule candidates and the reconstructed vessel tree was evaluated. A nodule candidate having an overlap with the vessel tree of more than a preset threshold can be identified as a false positive and removed from the final results. The results of this experiment for the actual clinical thoracic CT scans are presented in Table 3. By using an overlap ratio greater or equal to 40% it is possible to remove 466 out of 1219 (38%) of the false positives while removing 3 out of 61 (5%) true positives. Similarly, by using a threshold value greater or equal to 45% it is possible to remove 29% of the false positives while removing only 1.6% of the true positives. The use of this overlap measure necessitates the segmentation of vessels. The vessel tree construction in this context has the advantage of involving higher level knowledge regarding the nature of the data which is used for segmenting the data while coping with noise and gaps. Additionally, by using features computed based on the constructed vessel tree it is expected that these results can be improved further.

TABLE 3

| | Overlap Threshold | | | | | | | | | | | | | | | | | | | |
|---|---|---|---|---|---|---|---|---|---|---|---|---|---|---|---|---|---|---|---|---|
| | 5 | 10 | 15 | 20 | 25 | 30 | 35 | 40 | 45 | 50 | 55 | 60 | 65 | 70 | 75 | 80 | 85 | 90 | 95 | 100 |
| No. of removed TP's | 18 | 11 | 12 | 5 | 3 | 6 | 3 | 2 | 1 | 0 | 0 | 0 | 0 | 0 | 0 | 0 | 0 | 0 | 0 | 0 |
| No. of Removed FP's | 160 | 73 | 104 | 112 | 100 | 107 | 97 | 116 | 88 | 66 | 52 | 43 | 35 | 15 | 10 | 12 | 7 | 6 | 5 | 11 |

The comparison of the manual and automated results was performed by computing the intersection of the corresponding voxel data sets and evaluating the ratio between the number of voxels in the intersection set and the number of voxels in the manual set. The result was then converted to reflect the percentage of vessel false negative error. The experiment was repeated with and without the removal of nodules in the filtering stage. The results of this experiment are presented in Table 2. As can be observed the average false negative error rate without nodules is approximately 10% whereas with nodules it is only 1%. A detailed analysis of the results reveals that the majority of vessel errors that are caused by nodule removal occur mainly in large vessels at the center of the lung that do not conform to the ideal model of vessel/junction eigenvalues distribution.

The trade-off between false positives and false negatives is an important issue. With a threshold of 40%, nearly twice as many false positives could be reduced relative to a 50% threshold; the associated cost of this improvement is three more false negatives representing a true positive loss of 5%. The relative merits of different thresholds in terms of false-positive reduction and true-positive loss can be seen from the complete set of data in Table 3. The main source of errors in the reconstructed vessel tree is the suppression of parts of vessels and junctions not conforming to the ideal models.

The overlap-ratio-approach to the reduction of false positives generated by the separate automated lung nodule detection method was used as a straightforward mechanism for combining the output from the vessel segmentation method

TABLE 2

| | Case 1 | Case 2 | Case 3 | Case 4 | Case 5 | Case 6 | Case 7 |
|---|---|---|---|---|---|---|---|
| With Removal | 8.78 | 6.44 | 15.03 | 9.21 | 10.47 | 9.98 | 3.17 |
| Without Removal | 1.06 | 0.72 | 0.98 | 1.41 | 1.23 | 1.08 | 0.26 |

The final assessment of the vessel tree reconstruction algorithm evaluated the results in terms of their effect on the nodule detection algorithm according to S. Armato III, M. Altman, and P. La Riviere, "Automated detection of lung and the nodule detection method. The logic of such an approach is based on the observation that most false positives generated by the nodule detection method involve pulmonary vessels.

Thus the invention provides a novel approach to vessel tree representation construction, and its application to, among other things, nodule detection in thoracic CT scans. The method of this invention enhances vessels, including vessel junctions, and nodules by using enhancing filters, and uses fuzzy shape analysis for vessel tree representation construction.

The vessel enhancing filters of this invention are less sensitive to noise, due at least in part to the use of first-order partial derivatives. The proposed filters are computed in adaptive windows to avoid the need for processing at multiple scales. The filters of this invention are faster than multiple-scale filters and do not suffer from the problem of object enlargement due to large kernel smoothing at coarse scales. The correlation-based filters of this invention employ three sets of eigenvalues of the correlation matrix and so are capable of making a distinction between junctions and nodules which is not possible when using one set of eigenvalues. The filter output is particularly useful in constructing vessel tree representation that are, in turn, useful for, for example, enhancing nodule or other diseased tissue detection in diagnostic images.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method for improving a diagnostic image, the method comprising:
    obtaining a diagnostic image from an imaging device, the diagnostic image including vessels and surrounding tissues;
    removing non-relevant regions in the image using a data processor;
    identifying a plurality of voxels of the image;
    determining a center of an object in the plurality of voxels of the image as a function of derivatives of a voxel intensity value;
    establishing a local neighborhood window around the determined center of the object;
    determining an intensity gradient vector field within the local neighborhood window; and
    identifying the object as a vessel, vessel junction, or a nodule using the intensity vector field;
    wherein at least one of the steps of determining a center of an object, establishing a local neighborhood window, and determining an intensity gradient vector field is performed using a first-order partial derivative calculation.

2. The method of claim 1, wherein the plurality of voxels comprises at least voxels having an intensity value above a predetermined threshold.

3. The method of claim 1, further comprising analyzing a regularized vessel direction in the local neighborhood window using the intensity gradient vector field.

4. The method of claim 1, further comprising constructing a vessel tree representation from a plurality of identified vessels and vessel junctions.

5. The method of claim 1, additionally comprising determining within the local neighborhood window a principal vessel direction along a minimal principal curvature direction of a vessel surface obtained by determining a direction that minimizes a projection of all gradient vectors in the local neighborhood window.

6. The method of claim 5, additionally comprising determining an eigenvector belonging to a largest eigenvalue of the local neighborhood window.

7. The method of claim 1, further comprising determining a principal vessel direction of the object as a function of an eigenvalue of a correlation matrix of the regularized vessel directions within the intensity gradient vector field.

8. The method of claim 7, further comprising removing vectors aligned with the principal vessel direction and determining whether an additional principal vessel direction is present, and identifying the object as a vessel junction when the additional principal vessel direction is present.

9. The method of claim 7, additionally comprising constructing a vessel tree representation as a function of the eigenvalue associated with the principal vessel direction for each of a plurality of local neighborhood windows of the diagnostic image.

10. The method of claim 1, further comprising:
    determining a plurality of vessel vector angles in the local neighborhood;
    determining a non-parametric estimate of the distribution of the angles in the local neighborhood;
    determining a plurality of parametric estimates of the distribution of the angles as a function of an expectation maximization algorithm;
    measuring a distance between the non-parametric estimate and at least one of the parametric estimates.

11. The method of claim 10, additionally comprising constructing a vessel tree representation as a function of the distance measurement.

12. A method for improving a diagnostic image, the method comprising:
    obtaining a diagnostic image from an imaging device, the diagnostic image including vessels and surrounding tissues;
    removing non-relevant regions in the image using a data processor;
    identifying and enhancing the vessels to be detectable against the surrounding tissues of the lung in the lung image by establishing a plurality of local neighborhood windows each including a plurality of voxels representing an object, determining a center of an object in each of the windows, determining an intensity gradient vector field within each of the windows, and determining a principal vessel direction within each of the windows as matching a vector that is approximately orthogonal to gradients of the intensity gradient vector field; and
    constructing a three-dimensional vessel tree representation from the enhanced vessels and vessel junctions using the data processor.

13. The method of claim 12, additionally comprising subtracting the vessel tree representation from the image to enhance the visibility of nodules in the image.

14. The method of claim 12, wherein constructing a vessel tree representation from the enhanced vessels comprises producing a plurality of fuzzy shape vessel representations and combining the plurality of fuzzy shape vessel representations to form a vessel segment.

15. The method of claim 12, wherein constructing a vessel tree representation from the enhanced vessels comprises:
producing a plurality of fuzzy spheres, each of the plurality of fuzzy spheres disposed around the center of an object in one of the plurality of voxels; and
combining the plurality of fuzzy spheres to form a vessel segment.

16. The method of claim 15, additionally comprising adjusting the orientation of the vessel segment.

17. The method of claim 15, additionally comprising applying a vessel tree reconstruction algorithm to merge the vessel segment with a plurality of other vessel segments to form the vessel tree representation.

18. The method of claim 12, additionally comprising analyzing properties of the vessel tree representation.

19. The method of claim 12, wherein enhancing the vessels comprises an iterative principal direction estimation or a probabilistic direction analysis.

20. A method for improving a diagnostic image, the method comprising:
obtaining a thoracic diagnostic image from an imaging device;
removing non-lung regions in the image to provide a lung image including vessels and surrounding tissues of a lung;
enhancing the vessels to be detectable against the surrounding tissues of the lung in the lung image by establishing a plurality of local neighborhood windows each including a plurality of voxels representing an object, determining a center of an object in each of the windows, and determining a principal vessel direction within each of the windows;
constructing a three-dimensional vessel tree representation from the enhanced vessels; and
subtracting the vessel tree representation from the lung image to enhance the visibility of nodules using the data processor.

* * * * *